(12) United States Patent
Liao et al.

(10) Patent No.: US 8,193,670 B2
(45) Date of Patent: Jun. 5, 2012

(54) MAGNETORHEOLOGICAL ACTUATORS

(75) Inventors: Wei Hsin Liao, Hong Kong (HK); Hongtao Guo, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 289 days.

(21) Appl. No.: 12/722,146

(22) Filed: Mar. 11, 2010

(65) Prior Publication Data
US 2010/0231069 A1    Sep. 16, 2010

Related U.S. Application Data

(60) Provisional application No. 61/202,539, filed on Mar. 11, 2009.

(51) Int. Cl.
*H02K 7/10* (2006.01)
(52) U.S. Cl. .......................................... 310/77; 310/98
(58) Field of Classification Search ............. 310/76–78, 310/98–100, 102 R, 102 A
See application file for complete search history.

(56) References Cited

U.S. PATENT DOCUMENTS

| | | | | |
|---|---|---|---|---|
| 3,812,928 A | * | 5/1974 | Rockwell et al. | 180/65.51 |
| 5,782,322 A | * | 7/1998 | Hauck et al. | 188/72.4 |
| 5,949,168 A | * | 9/1999 | Dieckmann et al. | 310/75 R |
| 6,153,988 A | * | 11/2000 | Reimann et al. | 318/5 |
| 6,672,684 B2 | * | 1/2004 | Mohr | 303/10 |
| 6,769,745 B2 | * | 8/2004 | Mohr et al. | 303/116.4 |
| 7,229,138 B2 | * | 6/2007 | Nakamura et al. | 303/119.2 |
| 7,686,145 B2 | * | 3/2010 | Akagi et al. | 192/13 R |

OTHER PUBLICATIONS

Guo, H. T., et al., "Magnetorheological Fluids Based Multifunctional Actuator for Assistive Knee Braces", International Conference on Robotics and Biomimetics, Guilin, China, Dec. 19-23, 2009.
Guo, H. T., et al., "Integrated design and analysis of smart actuators for hybrid assistive knee braces", Proc. of SPIE, vol. 7288, 2009.

* cited by examiner

*Primary Examiner* — Thanh Lam
(74) *Attorney, Agent, or Firm* — Ping Wang; Andrews Kurth, LLP (57) ABSTRACT

Provided is an actuator, comprising a motor/generator element and a clutch/brake element. The motor/generator element comprises a stator made of a high magnetic permeable material, an outer coil being wound around the stator; a rotor made of a high magnetic permeable material and with a plurality of permanent magnets fixed thereon; and a cavity configured to receive a fluid. The clutch/brake element is arranged in the cavity. An inner coil is wound around the clutch/brake element. The fluid is capable of producing a shear stress in response to an electromagnetic field induced from the inner coil.

25 Claims, 11 Drawing Sheets

MAGNETORHEOLOGICAL ACTUATORS

The present application Claims the benefit of U.S. provisional application Ser. No. 61/202,539 filed on Mar. 11, 2009. The entirety of the aforementioned application is incorporated herein by reference.

FIELD

The present application relates to a magnetorheological (MR) actuator, in particular, to a MR actuator that may function as a motor, a generator, a brake and/or a clutch.

BACKGROUND

An actuator is a functional device for moving or controlling a mechanism or system. The actuator can be classified as an active or semi-active actuator. The active actuator, such as the electric motor, consumes a large amount of power and may have difficulties to stop stopping a torque output thereof immediately in the event of excessive output occurrence. The most widely used methods for motor braking are either injecting inverse direct current or using external brakes or choppers. These methods cause high power consumption and could damage the devices in prolonged usage.

MR fluids-based actuators work well in semi-active means while consuming little power. MR fluids are suspensions consisting of iron particles or powders in a low-permeability base fluid. Under the influence of a magnetic field, a rheological behavior of the fluids is changed. The flow resistance increases considerably with a growing magnetic flux density. The rheological properties, such as the viscosity and shear stress of these fluids, change rapidly within a few milliseconds, and are reversible when the magnetic field is applied.

MR fluids possess some advantages. They may produce a high yield stress subject to a magnetic field while consuming little power. They also have good stability and a fast response time. In addition, it they may work in a broad range of temperatures. The applications of MR fluids have been considered in a variety of energy dissipation and transfer devices, such as shock absorbers, clutches, brakes, engine mounts, and so on. In the above applications, an electromagnetic element is utilized as the source of the magnetic field. Through changing the current applied to the coil, the magnetic field can be changed accordingly and so does the yield stress produced by MR fluids.

Meanwhile, with the development of science and technology, many sophisticated engineering applications, such as robots and medical devices, need actuation systems to perform desired complicated tasks. Actuators used in these applications are desired to have more than one function in many cases. However, no actuator functions as a motor, a generator, a clutch and a brake in one device.

SUMMARY

An actuator according to an embodiment of the present application comprises:
a motor/generator element comprising:
a stator made of a high magnetic permeable material, an outer coil being wound around the stator;
a rotor made of a high magnetic permeable material and with a plurality permanent magnets fixed thereon; and
a cavity configured to receive a fluid; and
a clutch/brake element arranged in the cavity, an inner coil being wound around the clutch/brake element, wherein the fluid is capable of producing a shear stress in response to an electromagnetic field induced from the inner coil.

An actuator according to another embodiment of the present application comprises:
a motor/generator element comprising:
a stator made of a high magnetic permeable material;
a rotor made of a high magnetic permeable material and with a plurality permanent magnets fixed thereon; and
a side plate around which a set of axial coils are wound, the axial coils being arranged corresponding to the plurality of permanent magnets; and
a clutch/brake element being co-axial with the motor/generator element, an inner coil being wound around the clutch/brake element, the clutch/brake element comprising a cavity for receiving a fluid which is capable of producing a shear stress in response to an electromagnetic field induced from the inner coil.

DETAILED DESCRIPTION

A MR actuator that may function as a motor, a generator, a brake, and a clutch is disclosed in the present application. Generally, the MR actuator, according to one embodiment of the application, comprises a motor/generator element and a clutch/brake element.

The motor/generator element in present application comprises a stator around which an outer coil is wound and a rotor with permanent magnets. The stator may be made of a high magnetic permeable material. The outer coil wound on the stator provides an electromagnetic field to drive the permanent magnets fixed on the rotor. The direction of the rotor may be detected by using a sensor (such as a hall sensor) that detects the direction of magnetic flux of the permanent magnets. Alternatively, the direction of the rotor may be detected by using an indirect rotor position sensing through a back EMF detection in an unexcited phase winding. The voltage on the outer coil may be thus changed by a controller according to the detected result so as to ensure that the rotor continues to rotate. Generally, the motor/generator element may be implemented by an interior-rotor configuration, an exterior-rotor configuration or an axial-flux-rotor configuration. A cavity is formed by the motor/generator element for placing the clutch/brake element and MR fluids therein.

Figure 1A:
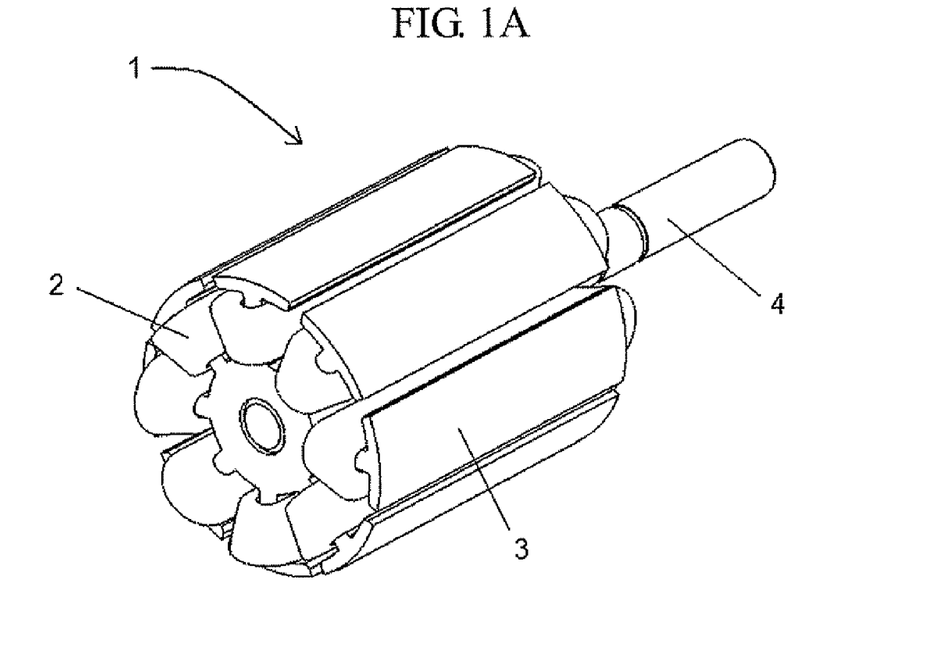
FIGS. 1A and 1B illustrate one kind of clutch/brake element used in the actuator according to the present application.
Figure 1B:
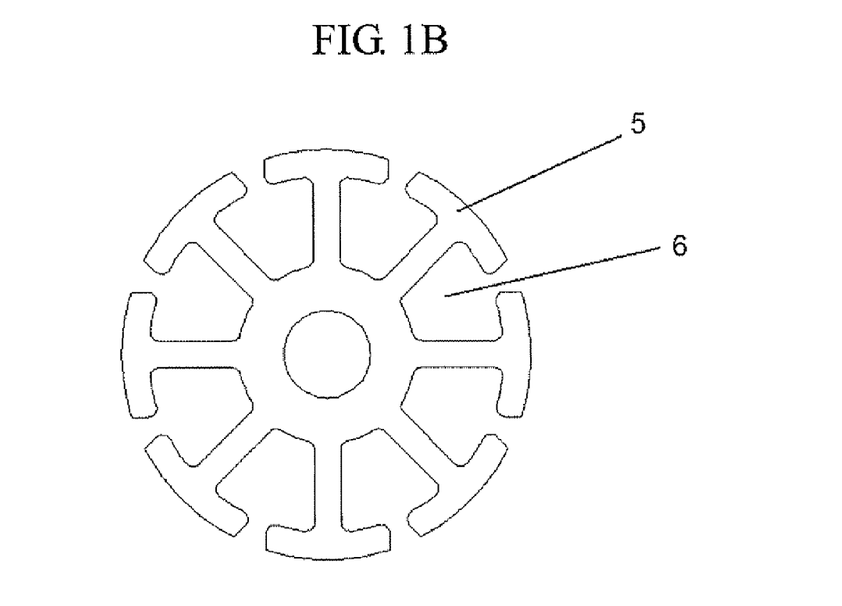

The clutch/brake element may be implemented by an inner armature with slots and shoes. In this case, inner coils are wound on each shoe of the inner armature. An example of such a clutch/brake element is illustrated in FIGS. 1A and 1B, which is identified with a reference number of 1. As shown, the clutch/brake element 1 comprises an inner coil 2, an inner armature 3 and a shaft 4. A plurality of turns of wire are wound on the inner armature 3, which is made of high magnetic permeable material in form of lamination with shoes 5 and slots 6 as illustrated in FIG. 1B. The shaft 4 is fixed into the inner armature 3 to transfer torque. An additional guide layer made of high magnetic permeable material may be utilized to guide the magnetic flux produced by the inner coil through the MR fluids.

Figure 2A:
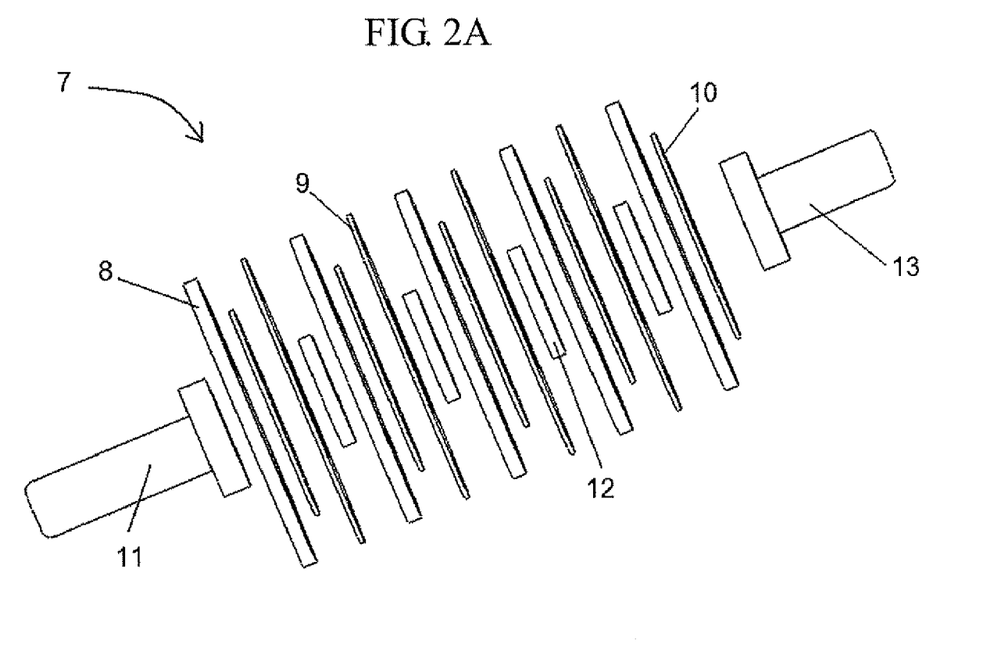
FIGS. 2A and 2B illustrate another kind of clutch/brake element used in the actuator according to the present application.
Figure 2B:
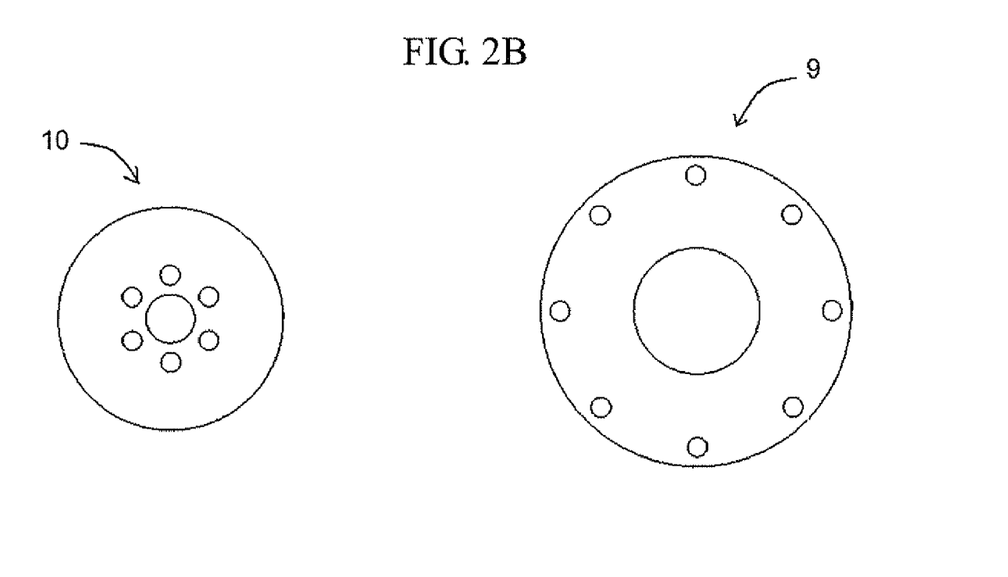

Alternatively, the clutch/brake element may be implemented by a plurality of input plates and output plates spaced apart by nonmagnetic spacer rings forming gaps therebetween to carry MR fluids. The output plates and spacer rings may be clamped by shafts with flanges. An example of such a clutch/brake element is illustrated in FIGS. 2A and 2B, which is indicated by a reference number of 7. As shown, the clutch/brake element 7 comprises a set of input plates 9 and a set of output plates 10 which are separated by input spacer rings 8 and output spacer rings 12. Two shafts 11 and 13 are used to fix these plates and transfer torque. In this case, the inner coil in the clutch/brake element may be formed by an interior coil, an exterior coil, or an axial coil.

For the interior inner coil, the coil is wound on a core in a cavity formed by shafts to provide electromagnetic field. For the exterior inner coil, the coil is wound on a nonmagnetic bobbin outside of the input/output plates instead of the inside core. For axial inner coil, the coil comprises two sets of axial coils which are in a circular pattern around the flanges. Each set of the coils provides opposite magnetic directions.

Based on such configurations, when a current is applied to the outer coil of the motor/generator element, an electromagnetic field will be induced, which will drive the rotor to rotate and then provide active torque output. Thus the actuator works as a motor. If a current is also applied to the inner coil, the MR fluids will produce a shear stress under the electromagnetic field induced from inner coil. As a result, the clutch/brake element transfers the torque from the rotor to outside as a clutch. In another situation of operation, when the current is applied only to the inner coil, the actuator functions as a brake. In this situation, with no current applied to the stator coil, if the rotor is driven by an external load, the actuator then becomes a generator to harvest energy produced from permanent magnets. Accordingly, the actuator with the above configuration can act as a motor, a generator, a brake, and a clutch as desired.

In a variation, if a shaft of the clutch/brake element is fixed with a housing of the actuator in the above various configurations, the MR actuator then can function as a motor, a generator and a brake. Similarly, when a current is applied to the outer coil of the motor/generator element, the induced electromagnetic field will drive the rotor to rotate and work as a motor. If a current is applied only on the inner coil, the actuator functions as a brake where the brake element will provide controllable torque. In another situation where the rotor is driven by the external load, the actuator becomes a generator to harvest energy produced from permanent magnets.

Hereinafter, illustrative embodiments of the actuator according to the present application will be described in details with reference to the accompanying drawings.

Figure 3:
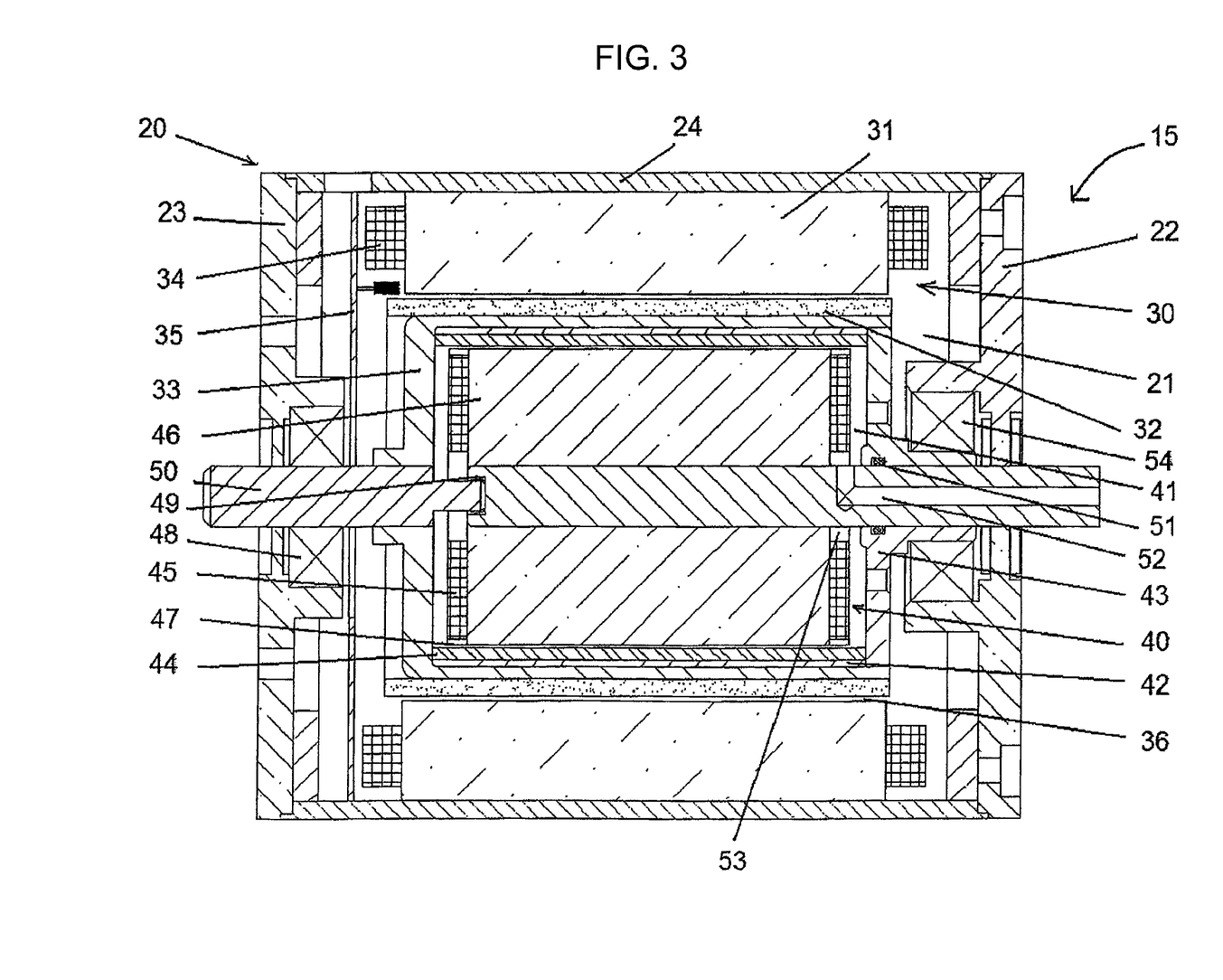
FIG. 3 illustrates an actuator according to a first embodiment of the present application.

Referring to FIG. 3, a MR actuator 15, according to a first embodiment of the present application, is illustrated. The MR actuator 15 comprises a motor/generator element 30 and a clutch/brake element 40 inside a cavity 21 defined by a housing 20. The housing 20 may comprise a cylinder 24 carried by two side plates 22 and 23 to provide a space for receiving the motor/generator element 30 and the clutch/brake element 40.

The motor/generator element 30 may comprise a stationary laminated stator 31 that advantageously comprises an outer coil 34. The stator 31 is generally made of high magnetic permeable material in the form of lamination to provide the expected magnetic field and improve the effect of the eddy current generated in the stator 31. The outer coil 34 comprises a plurality of turns of wire wound on the stator 31 and is effective for establishing an electromagnetic field when supplied with an electrical current. The motor/generator element 30 may also comprise a rotor 33 which may have a cylindrical shape and also be made of a high magnetic permeable material. The stator 31 and a number of permanent magnets 32 distributed in a circular pattern around the rotor 33 define a cylindrical air gap 36 therebetween. The magnetic direction of each of the permanent magnets 32 is aligned with N and S alternately on the rotor 33. A sensor such as a hall sensor with a control circuit 35 is used to sense changes in magnetic direction of the permanent magnets 32 during the rotation of the rotor, and then adjust voltage on the outer coil 34 to produce desired magnetic field for driving the permanent magnets 32. Therefore, the rotor 33 can rotate continuously.

The clutch/brake element 40 illustrated in the embodiment is in the form of the clutch/brake element 1 as shown in FIG. 1A. The clutch/brake element 40 is arranged in a cavity 41 defined inside the motor/generator element 30. In particular, the cavity 41 in this embodiment is defined by the rotor 33, an isolation layer 42, a housing cover 43 and a guide layer 44. The isolation layer 42 is made of a nonmagnetic material and is fixed inside the rotor 33 to insulate the magnetic field of the permanent magnets 32, while the guide layer 44 is made of high magnetic permeable material to guide the magnetic flux from an inner armature 46. The housing cover 43 is made of high magnetic permeable material to form a magnetic shield for the clutch/brake element 40. In the embodiment, the clutch/brake element 40 comprises an inner armature 46 made of high magnetic permeable material and an inner coil 45 comprising a plurality of turns of wire wound on the inner armature 46. MR fluids are filled inside the cavity 41 and carry the electromagnetic flux produced by the inner coil 45 between a gap 47 defined by the guide layer 44 and the inner armature 46 which may be covered by a shell 53.

A shaft 50 with a hole 52 is supported by bearings 48, 49 and 54. The hole 52 is used to extend wires outside. A seal 51 may be used to provide dynamic sealing to prevent MR fluids leaking from the cavity 41 while not reducing the MR actuator's rotary movement.

Figure 4:
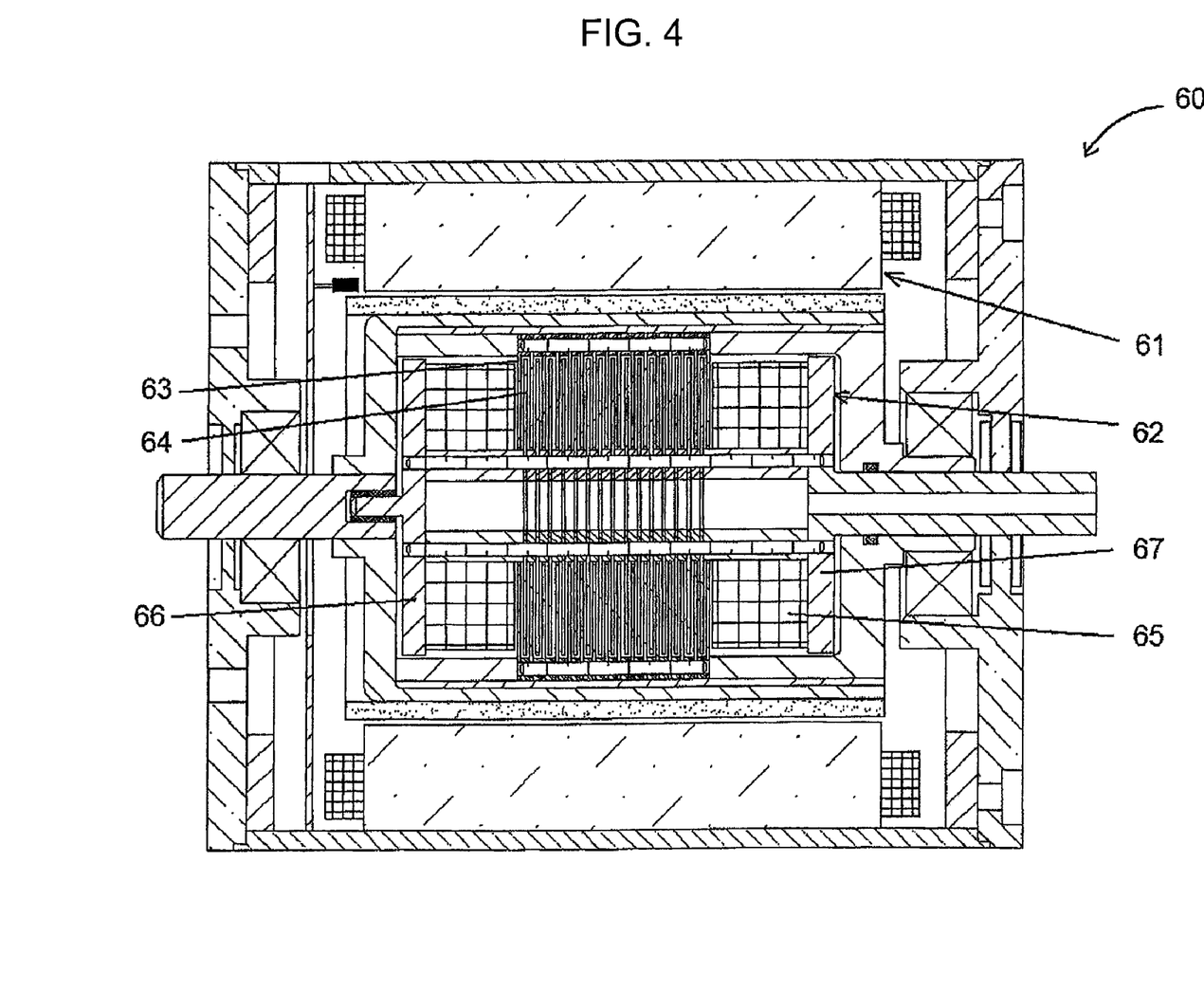
FIG. 4 illustrates an actuator according to a second embodiment of the present application.
Figure 5A:
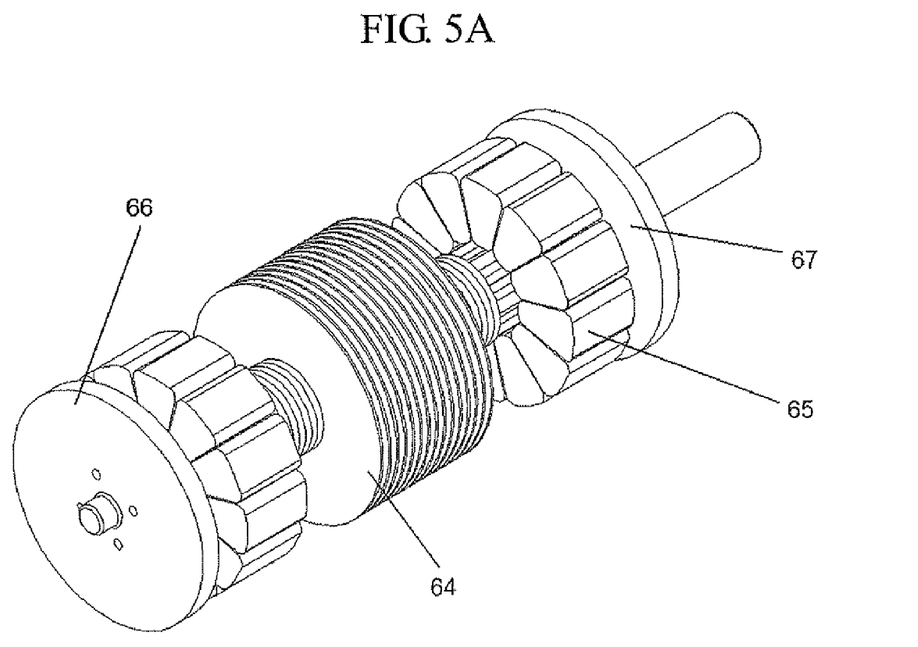
FIGS. 5A and 5B illustrate the exploded view and the front view of the inner coil of the actuator in FIG. 4.
Figure 5B:
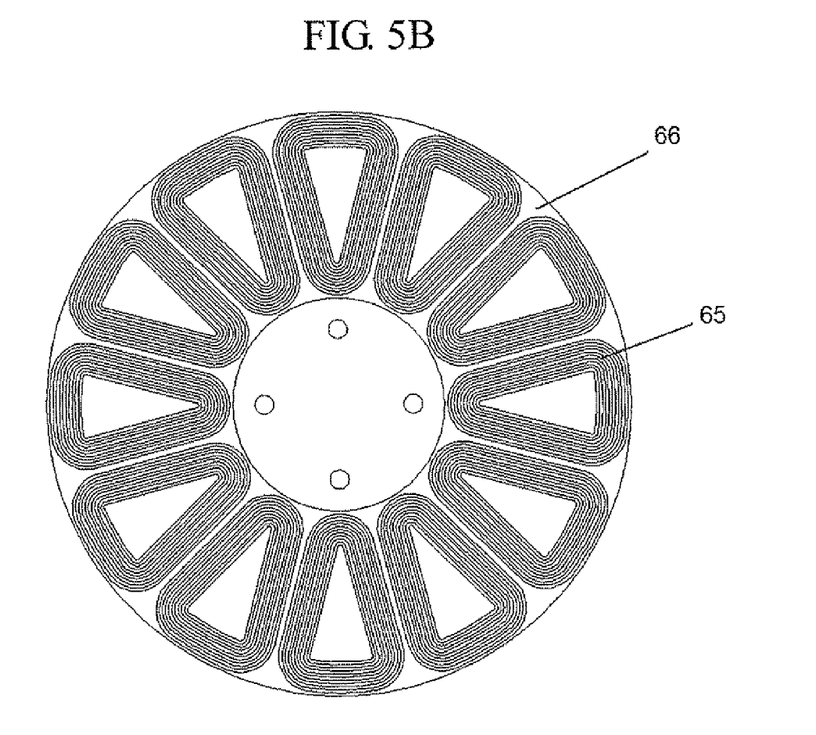

Referring to FIG. 4, an MR actuator 60, according to a second embodiment of the present application, is illustrated. Similar to the actuator 15, the actuator 60 comprises a motor/generator element 61 and a clutch/brake element 62. The difference between the actuator 15 and the actuator 60 lies in that the clutch/brake element 62 is in the form of the clutch/brake element 7 illustrated in FIG. 2A. In this embodiment, the inner coil 65 is an axial inner coil, which comprises two sets of axial coils in a circular pattern around the flanges. Each set of the coils provides opposite magnetic directions. The exploded view and the front view of the inner coil 65 are illustrated in FIGS. 5A and 5B, respectively. Under the electromagnetic field produced by an inner coil 65, input plates 63 and output plates 64 within MR fluids will produce torque to work as clutch or brake, depending on whether a current is applied to the outer coil. The inner coil 65 comprises of a set of axial windings sticked on shafts with flanges 66 and 67. The flanges are made of high magnetic permeable material and the magnetic direction of each set of coils is opposite to each other. Therefore, the magnetic flux produced by inner coil 65 can penetrate the input and output plates 63 and 64, providing expected torque.

Figure 6:
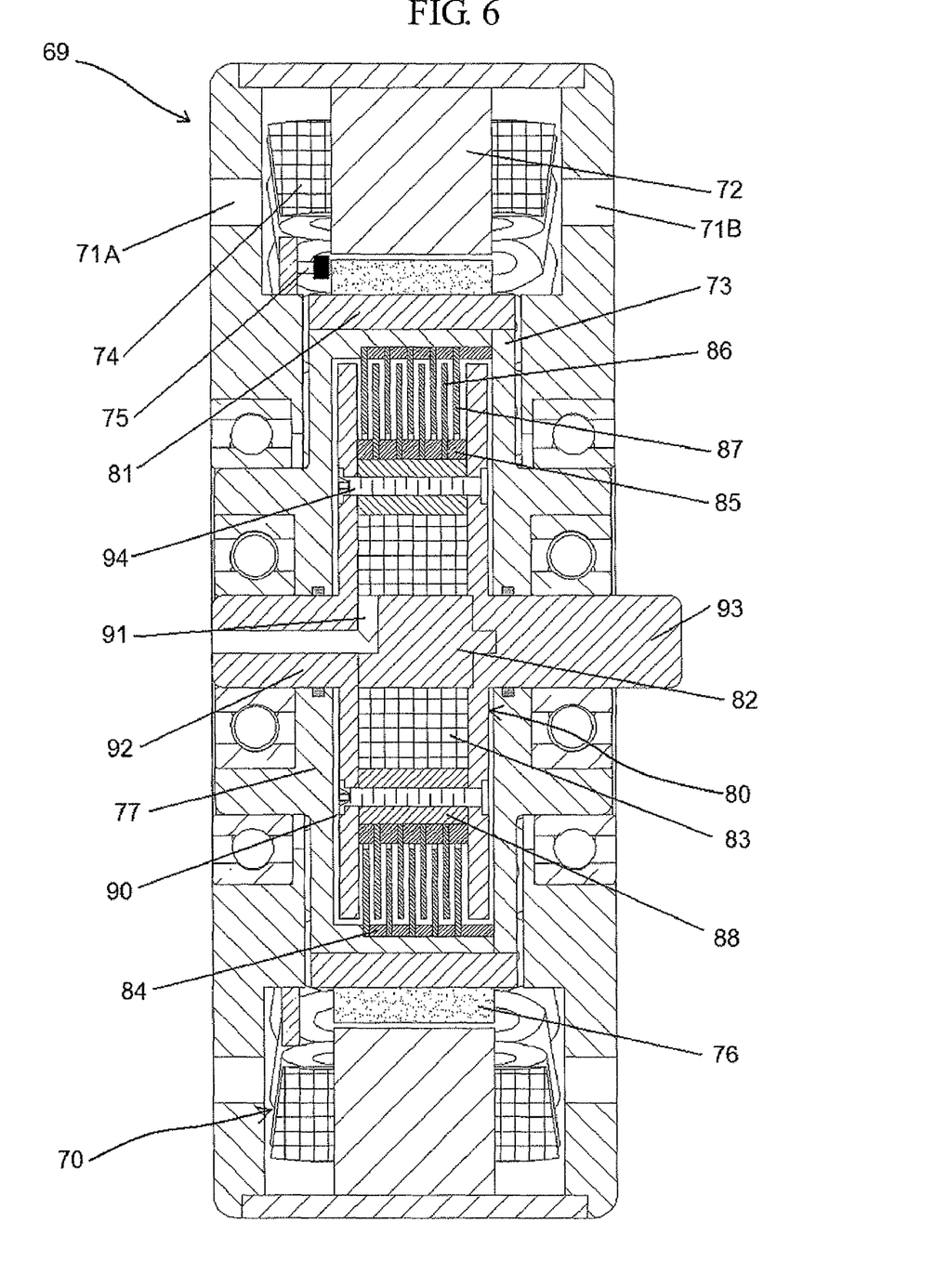
FIG. 6 illustrates an actuator according to a third embodiment of the present application.

Referring to FIG. 6, an MR actuator 69, according to a third embodiment of the present application, is illustrated. The configuration of the MR actuator 69 is similar to the MR actuator 60. The MR actuator 69 comprises motor/generator element 70 and clutch/brake element 80 inside the cavity defined by a housing of the actuator.

The motor/generator element 70 comprises a stationary laminated stator 72 that advantageously comprises outer coil 74. The stator 72 is generally made of high permeable material in the form of lamination to provide expected magnetic field and improve the effect of eddy current generated in the stator 72. The outer coil 74 comprises a plurality of turns of wire wound on the stator 72 and is effective for establishing an electromagnetic field when supplied with electrical current. A number of axial openings 71A and 71B are distributed in a circular pattern around the side plates, so that circulating air can pass the axial openings 71A and 71B to expel heat, which is commonly generated by the outer coil 74. The magnetic direction of each permanent magnet of 76 is aligned with N and S alternately on the rotor 81, which is made of high magnetic permeable material. A hall sensor with control circuit 75 is used to sense changes in magnetic direction of the permanent magnets 76 during rotation and then adjust voltage on the outer coil 74 to produce the desired magnetic field for driving the permanent magnets 76. Therefore, the rotor 81 can rotate continuously.

The clutch/brake element 80 involves a cavity 90 defined by a housing cover 73 and a housing cylinder 77 where MR fluids are filled in. The inner coil 83 comprises a plurality of turns of wire wound on a core 82 which is made of high magnetic permeable material and is covered by a nonmagnetic insulation layer 88 and a set of output plates 86. The output plates 86 are spaced apart by a number of nonmagnetic spacer rings 85 and clamped between two shafts with flanges 92 and 93 with a number of nonmagnetic fasteners 94. A set of input plates 87 are located underneath the housing cylinder 77 and extend radially in-between adjacent output plates 86 which are carried and spaced apart at their outer periphery by the nonmagnetic spacer rings 84. Input plates 87, output plates 86 and two shafts 92 and 93 are all made of high magnetic permeable materials so as to form a magnetic circuit to carry the magnetic flux produced by the inner coil 83. Wires of inner coil 83 extend outside of the MR actuator 69 through holes 91. Housing covers 73 and housing cylinder 77 made of nonmagnetic materials are held and supported by bearings.

Figure 7:
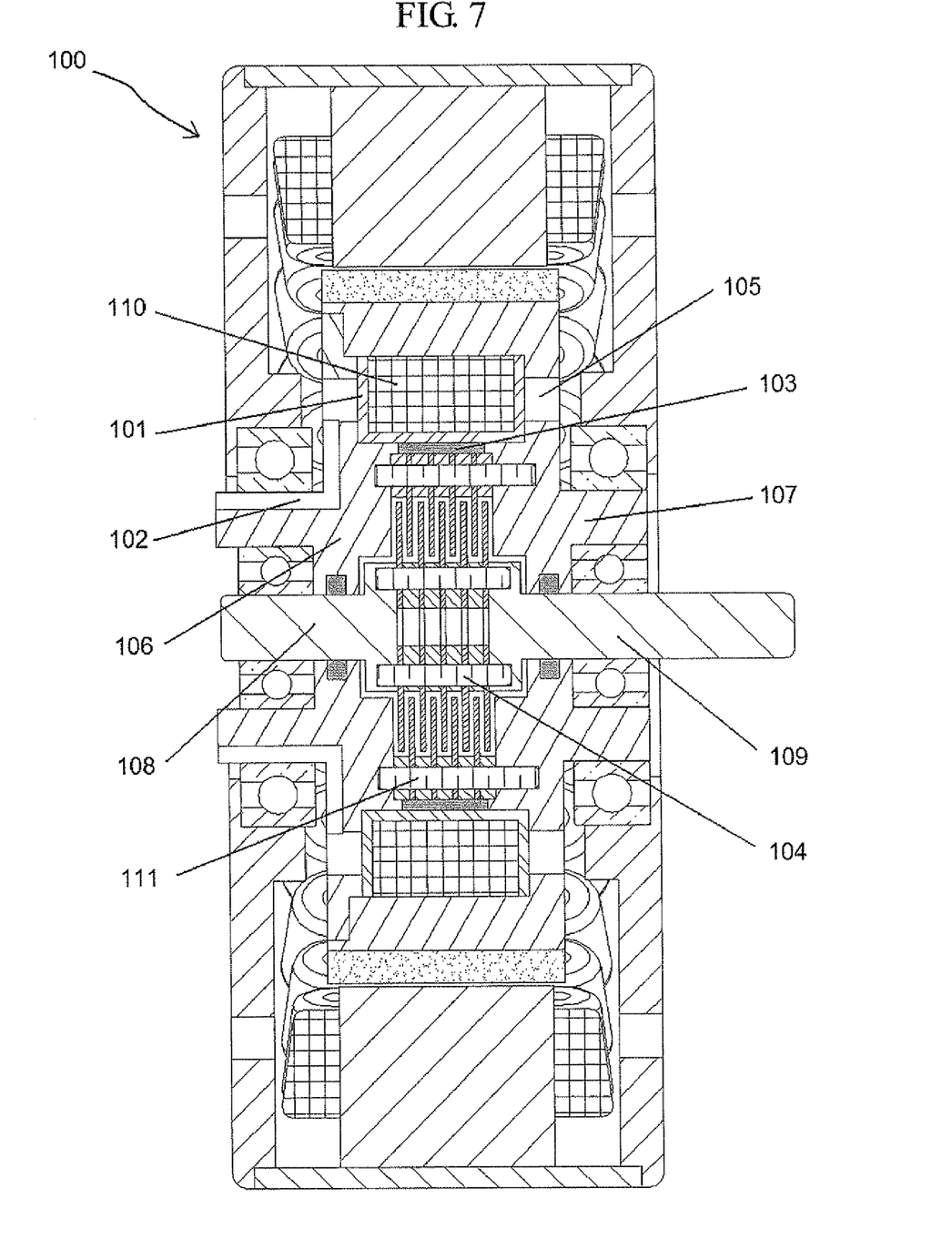
FIG. 7 illustrates an actuator according to a fourth embodiment of the present application.

Referring to FIG. 7, an MR actuator 100 according to a fourth embodiment of the present application is illustrated. The configuration is similar to the MR actuator 69. Different from the MR actuator 69, the inner coil 110 is at the periphery of the plates and underneath the rotor 107. The inner coil 110 is wound on a bobbin 101 which is made of nonmagnetic material with holes 105 to expel heat from inner coil 110. Rotor 107 and rotor cover 106, which are fixed by nonmagnetic fasteners 111, are all made of high magnetic permeable materials to form a magnetic circuit to carry flux. Sealing ring 103 which is made of nonmagnetic material is clamped in-between the rotor 107 and rotor cover 106. Wires of inner coil 110 extend outside the clutch/brake element through the hole 102. Nonmagnetic fasteners 104 are used to fix the shafts with flange 108 and 109 which are all made of nonmagnetic materials.

In the above embodiments, the motor/generator elements are formed in the interior-rotor configuration in which the rotor is arranged inside the stator and thus the cavity in which the clutch/brake elements are located is formed inside the rotor. As stated, the motor/generator element can also be formed in other configurations such as the exterior-rotor configuration and the axial-flux-rotor configuration. In these configurations, the clutch/brake element is also arranged in a cavity formed inside the motor/generator element. The exterior-rotor configuration and the axial-flux-rotor configuration are shown FIGS. 8 and 10, respectively and will be described hereinafter.

Discussed above are MR actuators having four functions of a motor, a generator, a clutch and a brake according to the present application. When a current is applied to the outer coil of the motor/generator element, an electromagnetic field will be induced, which will drive the rotor to rotate and then provide active torque. Thus the actuator works as a motor. If a current is also applied to the inner coil, the MR fluids will produce shear stress under the electromagnetic field induced from the inner coil. As a result, the clutch/brake element can transfer the torque from the rotor to outside as a clutch. In another operation, when the current is applied only on the inner coil, the actuator functions as a brake. In this situation, with no current applied to the stator coil, if the rotor is driven by an external load, the actuator then becomes a generator to harvest energy produced from permanent magnets.

As a variation, an MR actuator having three functions of a motor, a generator and a brake according to the present application is also disclosed, which will be described with reference to FIGS. 8-11 below. In the MR actuator having three functions of a motor, a generator and a brake, a shaft of the clutch/brake element is fixed with a housing of the actuator.

Figure 8:
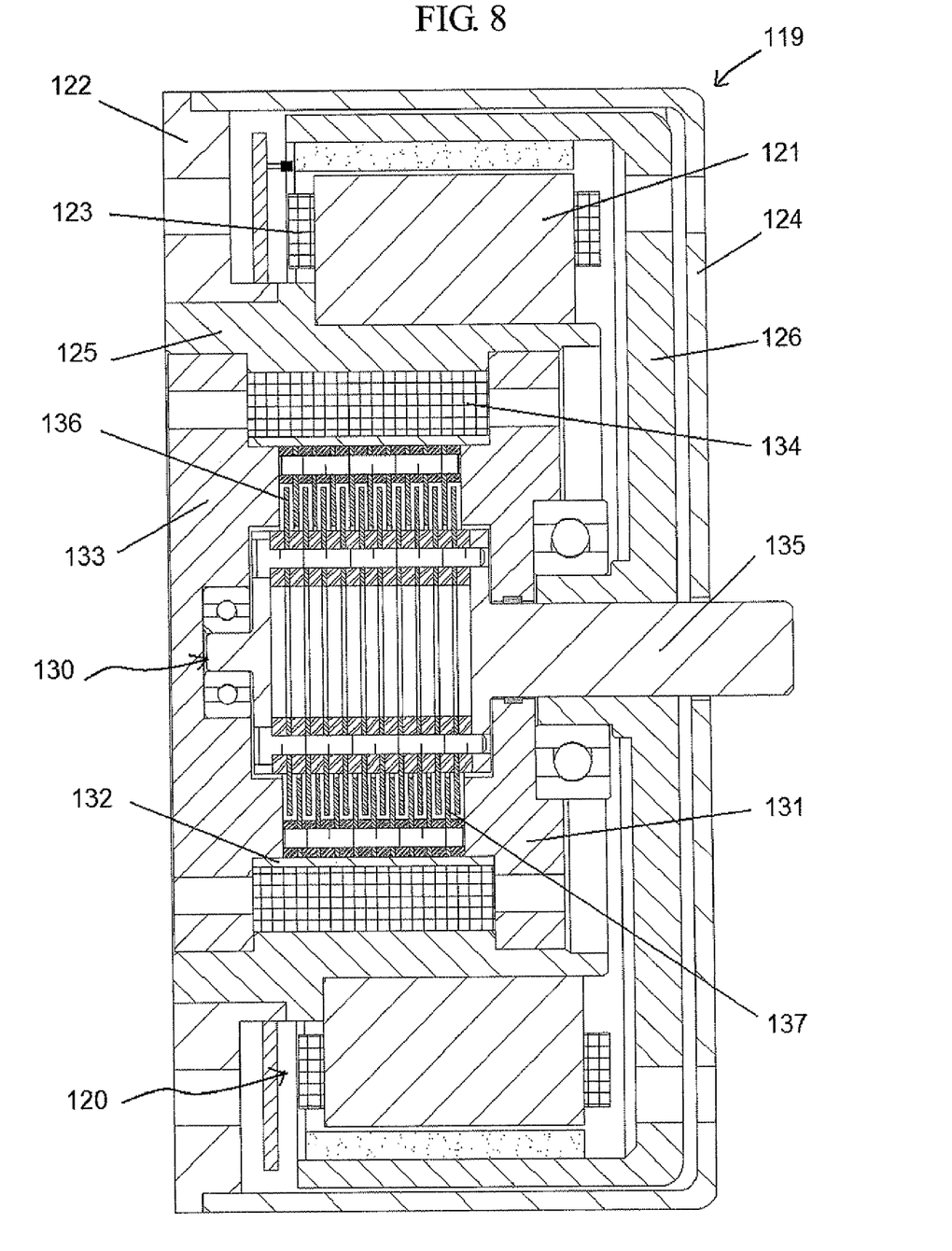
FIG. 8 illustrates an actuator according to a fifth embodiment of the present application.

Referring to FIG. 8, an MR actuator 119, according to a fifth embodiment of the present application, is illustrated. In general, MR actuator 119 comprises a motor/generator element 120 and a brake element 130. Different from the MR actuators 15, 60, 69 and 100 of which the rotors are in the form of interior-rotors, the MR actuator 119 has an exterior-rotor 126 which surrounds the outside of the stator 121. Housing covers 122 and 124 define an annular cavity for receiving the motor/generator element 120 and brake element 130.

The motor/generator element 120 comprises a stationary laminated stator 121 which is generally made of high permeable material to provide magnetic field. The outer coil 123 comprises a plurality of turns of wire wound on the stator 121 and is effective for establishing an electromagnetic field when supplied with electrical current. The stator 121 is fixed on a cylindrical base 125 which is made of high magnetic permeable material and engaged with a housing cover 122 of the actuator so as to fix the stator 121 and define a space for receiving the brake element 130.

The brake element 130 involves housing covers 132 and 133 to define a cavity where MR fluids are filled in. A cylindrical isolation ring 131 made of nonmagnetic material works as a bobbin where the inner coil 134 is wound on. The brake element 130 shown in FIG. 8 is in the form of the clutch/brake element 7 in FIG. 2A. The shaft 135 is fixed on the rotor 126 and therefore the rotary plates 136 will rotate with the rotor 126. Brake plates 137 and rotary plates 136 are all made of high magnetic permeable material as the same as the housing covers 132 and 133 forming a magnetic circuit to carry the magnetic flux produced by inner coil 134.

Figure 9:
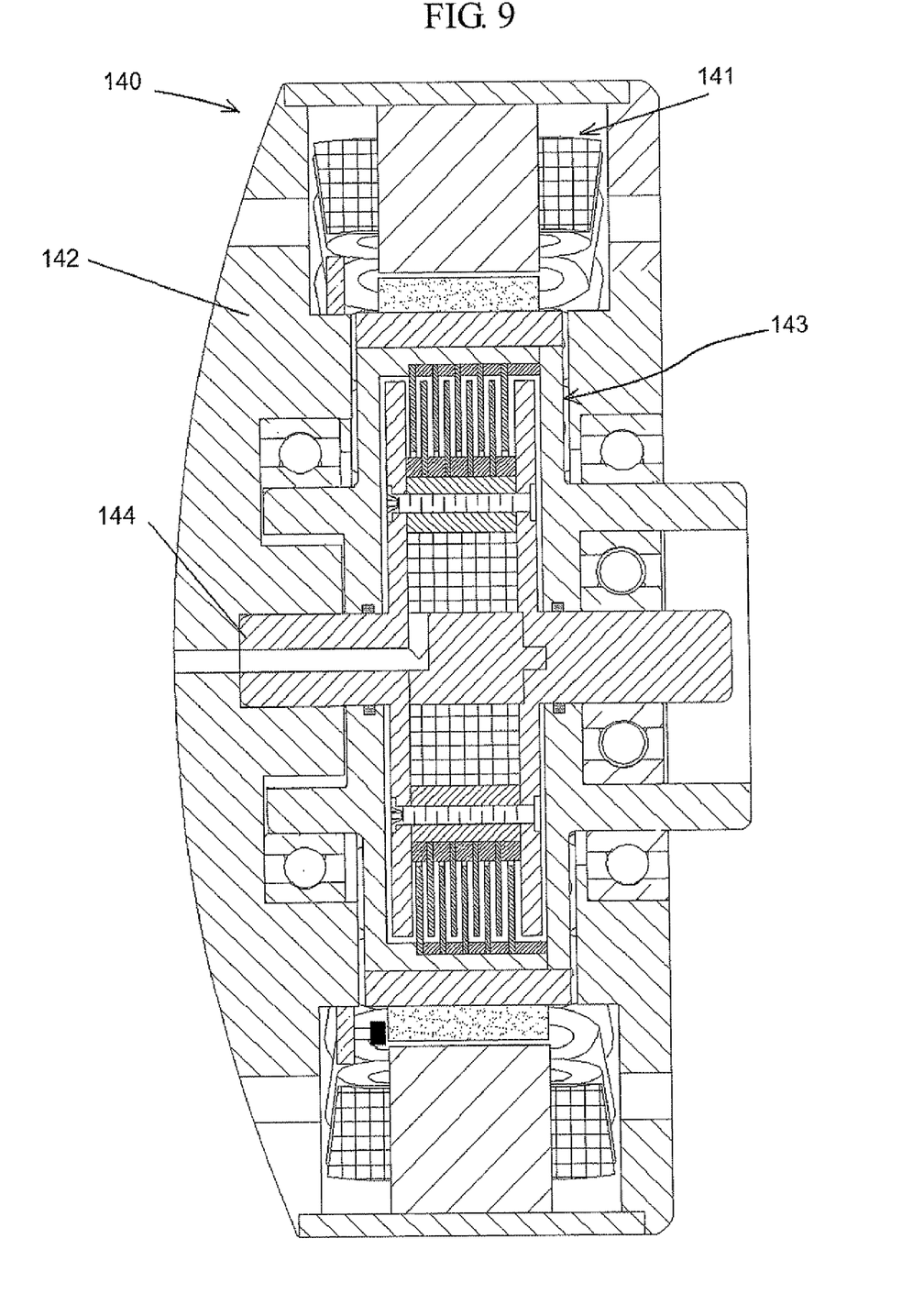
FIG. 9 illustrates an actuator according to a sixth embodiment of the present application.

Referring to FIG. 9, an MR actuator 140, according to a sixth embodiment of the present application, is illustrated. Similar to the MR actuator 69, the MR actuator 140 comprises a motor/generator element 141 and a brake element 143. Mainly, the different elements of the MR actuator 140 from 69 are housing cover 142 and the shaft with flange 144 where the shaft 144 is fixed in the housing cover 142.

Figure 10:
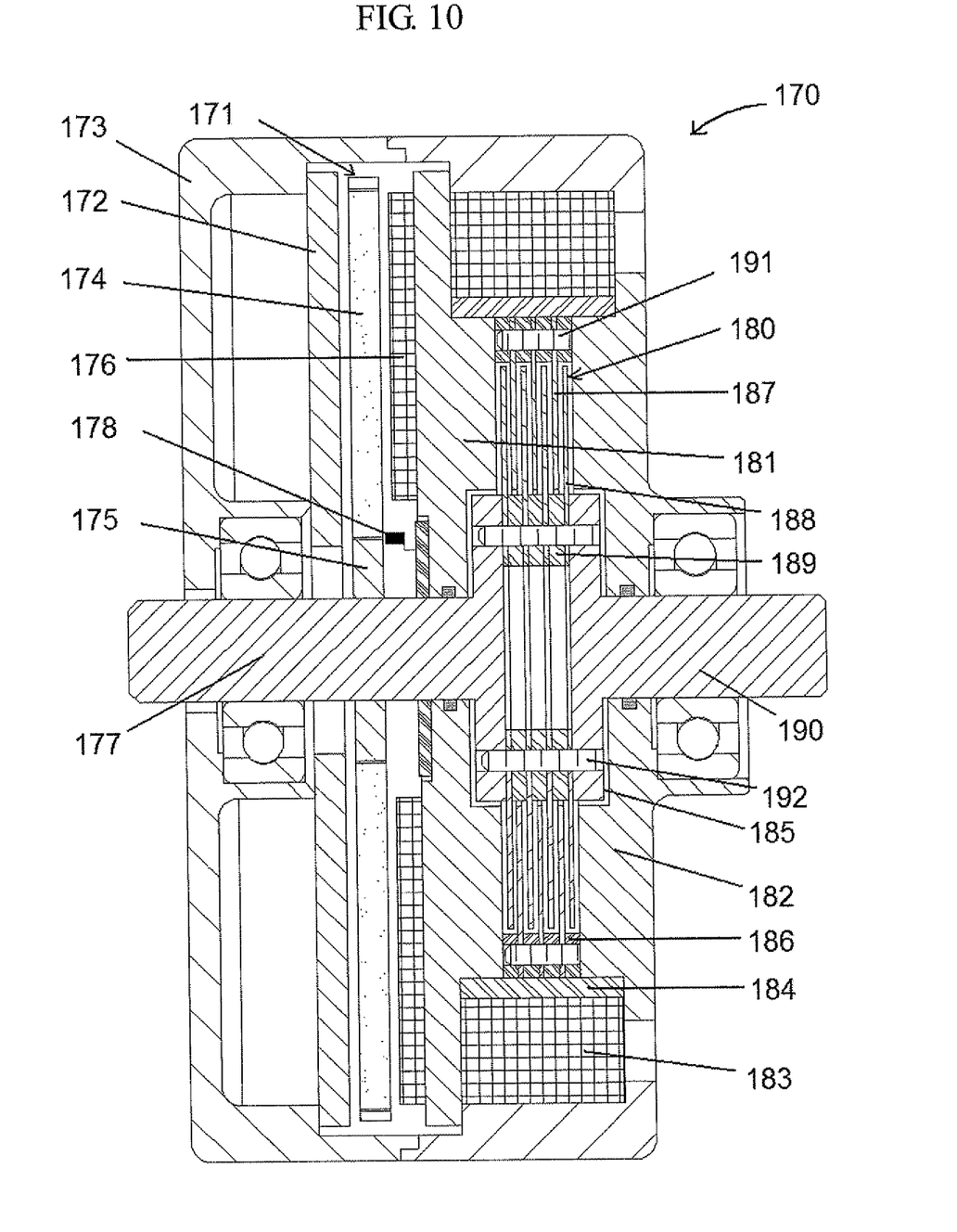
FIG. 10 illustrates an actuator according to a seventh embodiment of the present application.

Referring to FIG. 10, an MR actuator 170, according to a seventh embodiment of the present application, is illustrated. The MR actuator 170 comprises a motor/generator element 171 and a brake element 180.

Figure 11A:
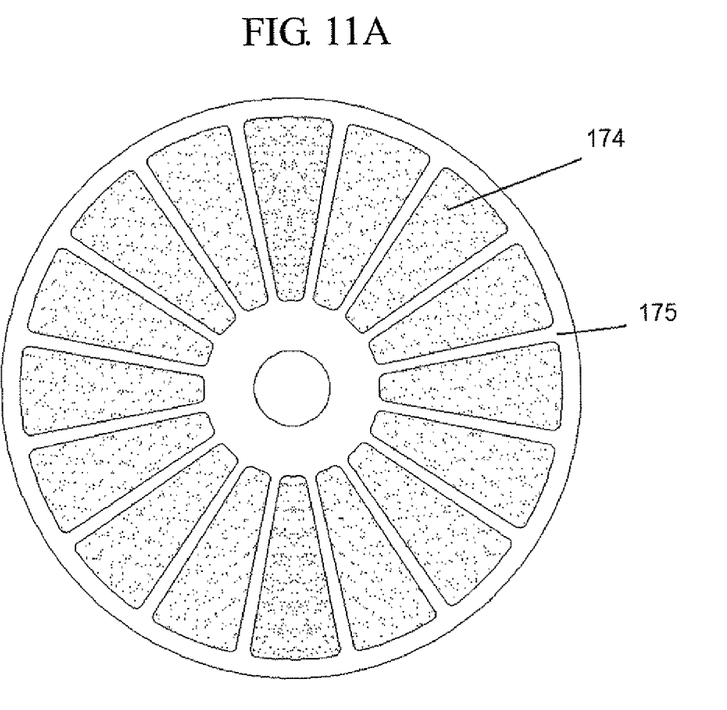
FIGS. 11A and 11B illustrate the front views of the permanent magnets, the rotor and the coils of the actuator in FIG. 10.
Figure 11B:
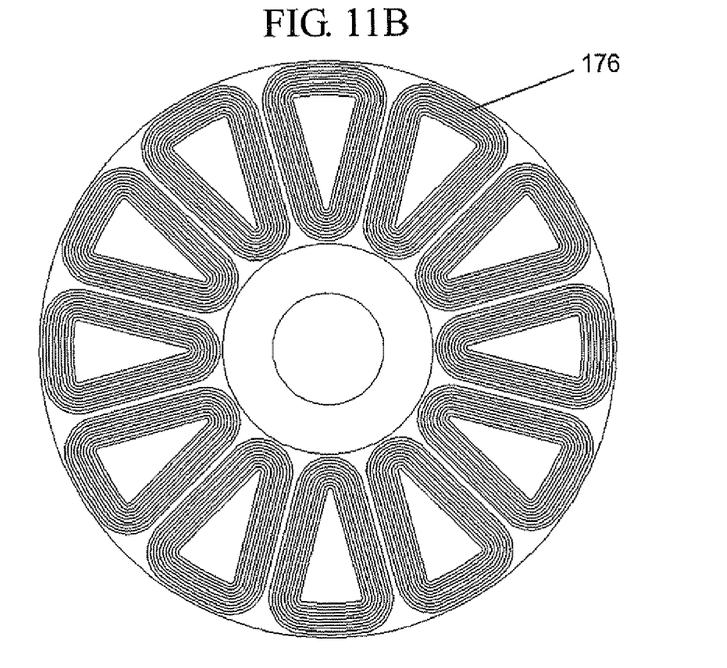

The motor/generator element 171 comprises a stationary guide plate 172 made of high magnetic permeable material which is fixed on the housing cover 173 to guide the magnetic flux from permanent magnets 174. The permanent magnets 174 comprise a number of permanent magnets in circular pattern embedded in the rotor 175 which is made of high magnetic permeable material. A set of axial coils 176 are fixed on the side plate 181 in a circular pattern with N and S aligned alternately. FIG. 11A and FIG. 11B illustrate the front views of permanent magnets 174, rotor 175 and coils 176. A hall sensor with control circuit 178 is used to sense changes in magnetic direction of each permanent magnet of 174 during the rotation of the rotor, and then adjust voltage on the coil 176 to produce desired magnetic field for driving the permanent magnets 174.

The brake element 180 involves a cavity 185 where MR fluids are filled in, which is defined by the side plate 181, a housing cover 182 and a cylindrical nonmagnetic bobbin 184. A coil 183 comprises a plurality of turns of wire wound on the bobbin 184. A number of nonmagnetic spacer rings 186 are utilized to space brake plates 187 apart to form gaps between brake plates 187 and rotary plates 188 which are adjacent to each other. The rotary plates 188 are spaced apart by a number of nonmagnetic spacer rings 189 and clamped by nonmagnetic shafts with flanges 177 and 190 together with a number of fasteners 192. The shaft 177 is fixed on the rotor 175 and therefore the rotary plates 188 can rotate with the rotor 175. The side plate 181, the housing cover 182 and both sets of plates 187 and 188 are all made of high permeable materials forming a magnetic circuit carrying the magnetic flux produced by the coil 183.

According to the above mentioned actuator that may work as a motor, a generator and a brake, when a current is applied to the outer coil of the motor/generator element, the induced electromagnetic field may drive the rotor to rotate and work as a motor. If a current is applied only to the inner coil, the actuator may function as a brake where the brake element will provide an output of controllable torque. In another situation where the rotor is driven by the external load, the actuator becomes a generator to harvest energy produced from permanent magnets.

While MR fluid is used in the embodiments, it is obvious for those skilled in the art that electrorheological (ER) fluid and/or electromagnetorheological (EMR) fluid can be used instead of the MR fluid.

It is understood for those skilled in the art that embodiments described herein are illustrative, but not limited. Technical features disclosed in various embodiments can be combined in any appropriate ways. Various modifications and variations of the described embodiments can be made within the scope and spirit of the present application.

What is claimed is:

1. An actuator, comprising:
   a motor/generator element comprising:
   a stator made of a high magnetic permeable material, an outer coil being wound around the stator;
   a rotor made of a high magnetic permeable material and with a plurality permanent magnets fixed thereon; and
   a cavity configured to receive a fluid; and
   a clutch/brake element arranged in the cavity, an inner coil being wound around the clutch/brake element,
   wherein the fluid is capable of producing a shear stress in response to an electromagnetic field induced from the inner coil.

2. The actuator according to claim 1, wherein the fluid comprises a magnetorheological fluid, an electrorheological fluid or an electromagnetorheological fluid.

3. The actuator according to claim 1, further comprising:
   an isolation layer made of a nonmagnetic material and located between the motor/generator element and the clutch/brake element to insulate a magnetic field of the permanent magnets.

4. The actuator according to claim 1, further comprising:
   a guide layer made of a high magnetic permeable material located between the motor/generator element and the clutch/brake element to guide a magnetic flux caused by the inner coil.

5. The actuator according to claim 1, wherein the rotor is arranged inside the stator and the cavity is formed inside the rotor, or the rotor surrounds outside the stator and the cavity is formed inside the stator.

6. The actuator according to claim 5, wherein the clutch/brake element comprises an inner armature made of a high magnetic permeable material around which the inner coil is wound.

7. The actuator according to claim 5, wherein the clutch/brake element comprises a set of input plates and a set of output plates spaced apart by a plurality of nonmagnetic spacer rings.

8. The actuator according to claim 7, wherein the clutch/brake element further comprises a core made of a high magnetic material around which the inner coil is wound.

9. The actuator according to claim 7, wherein the clutch/brake element further comprises a bobbin made of a nonmagnetic material outside of the input plates, and the inner coil is wound around the bobbin.

10. The actuator according to claim 7, wherein the clutch/brake element comprises two shafts with flanges made of a high magnetic permeable material, and the inner coil comprises a plurality of axial coils sticked on the flanges.

11. The actuator according to claim 1, wherein the outer coil is implemented by a print circuit.

12. The actuator according to claim 1, wherein the clutch/brake element has a shaft fixed to a housing of the actuator for receiving the motor/generator element and the clutch/brake element.

13. The actuator according to claim 1, further comprising:
   a sensor configured to sense a change of a magnetic direction of the permanent magnets; and
   a controller configured to adjust a voltage applied to the outer coil based on the sensed change so that the rotor is able to rotate continuously.

14. An actuator, comprising:
   a motor/generator element comprising:
   a stator made of a high magnetic permeable material;
   a rotor made of a high magnetic permeable material and with a plurality permanent magnets fixed thereon; and
   a side plate around which a set of axial coils are wound, the axial coils being arranged corresponding to the plurality of permanent magnets; and a clutch/brake element being co-axial with the motor/generator element, an inner coil being wound around the clutch/brake element, the clutch/brake element comprising a cavity for receiving a fluid which is capable of producing a shear stress in response to an electromagnetic field induced from the inner coil.

15. The actuator according to claim 14, wherein the fluid comprises a magnetorheological fluid, an electrorheological fluid or an electromagnetorheological fluid.

16. The actuator according to claim 14, further comprising:
an isolation layer made of a nonmagnetic material and located between the motor/generator element and the clutch/brake element to insulate a magnetic field of the permanent magnets.

17. The actuator according to claim 14, further comprising:
a guide layer made of a high magnetic permeable material located between the motor/generator element and the clutch/brake element to guide a magnetic flux caused by the inner coil.

18. The actuator according to claim 14, wherein the clutch/brake element comprises an inner armature made of a high magnetic permeable material around which the inner coil is wound.

19. The actuator according to 14, wherein the clutch/brake element comprises a set of input plates and a set of output plates spaced apart by a plurality of nonmagnetic spacer rings.

20. The actuator according to claim 19, wherein the clutch/brake element further comprises a core made of a high magnetic material around which the inner coil is wound.

21. The actuator according to claim 19, wherein the clutch/brake element further comprises a bobbin made of a nonmagnetic material outside of the input plates, and the inner coil is wound around the bobbin.

22. The actuator according to claim 19, wherein the clutch/brake element comprises two shafts with flanges made of a high magnetic permeable material, and the inner coil comprises a plurality of axial coils sticked on the flanges.

23. The actuator according to claim 14, wherein the outer coil is implemented by a print circuit.

24. The actuator according to claim 14, wherein the clutch/brake element comprises a shaft fixed to a housing of the actuator for receiving the motor/generator element and the clutch/brake element.

25. The actuator according to claim 14, further comprising:
a sensor configured to sense a change of a magnetic direction of the permanent magnets; and
a controller configured to adjust a voltage applied to the outer coil based on the sensed change so that the rotor is able to rotate continuously.

* * * * *